United States Patent [19]
Lankton

[11] Patent Number: 5,876,591
[45] Date of Patent: Mar. 2, 1999

[54] PROCESS FOR THE PRODUCTION OF LUBE OIL

[75] Inventor: Steven P. Lankton, Wheeling, Ill.

[73] Assignee: UOP LLC, Des Plaines, Ill.

[21] Appl. No.: 828,982

[22] Filed: Mar. 31, 1997

[51] Int. Cl.⁶ .................................................. B01D 3/10
[52] U.S. Cl. .......................... 208/358; 208/347; 208/366; 208/350; 208/357; 208/DIG. 1
[58] Field of Search ..................... 208/347, 366, 208/358, 350, 357, DIG. 1

[56] References Cited

U.S. PATENT DOCUMENTS

| | | | |
|---|---|---|---|
| 1,465,598 | 4/1923 | De Brey | 208/340 |
| 1,709,304 | 4/1929 | Bogart | 208/358 |
| 1,710,240 | 4/1929 | Peterkin, Jr. et al. | 208/357 |
| 2,081,855 | 5/1937 | Fellows | 208/354 |
| 2,453,205 | 11/1948 | Docksey | 208/358 |
| 2,534,870 | 12/1950 | Kraft | 208/358 |
| 3,371,032 | 2/1968 | Witt et al. | 208/351 |
| 3,886,062 | 5/1975 | Peiser et al. | 208/354 |
| 4,381,992 | 5/1983 | Wood et al. | 208/179 |
| 4,746,407 | 5/1988 | Olson | 203/1 |
| 4,894,145 | 1/1990 | Jensen | 208/347 |

*Primary Examiner*—Walter D. Griffin
*Assistant Examiner*—Nadine Preisch

[57] ABSTRACT

A process for fractionating a heavy hydrocarbon stream to produce a lube oil fraction having a constant, predetermined flash point. A liquid stream is removed from the fractionator, cooled in response to a fractionator top temperature and returned to the fractionator above the original draw point.

4 Claims, 1 Drawing Sheet

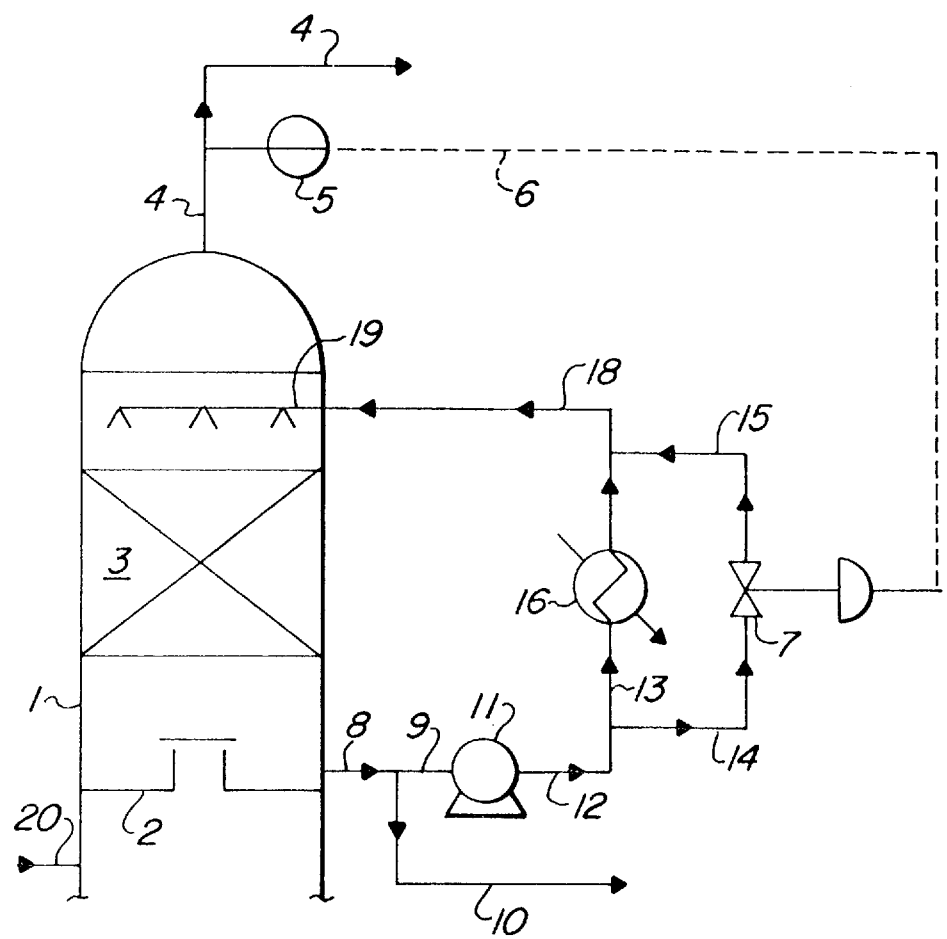

PROCESS FOR THE PRODUCTION OF LUBE OIL

FIELD OF THE INVENTION

The field of art to which this invention pertains is the production of a lube oil fraction having a constant, predetermined flash point.

BACKGROUND OF THE INVENTION

The production and recovery of lube oil is an important commercial process because of the ever-present and growing demand for high quality lubricants and lubricating oil which are used particularly in internal combustion engines. Unblended lube oil stocks are usually obtained by fractionating crude oil. However, recently a growing trend is to recover and recycle spent lubricating oil to produce lube oil blending stocks which are equal to or even better than virgin lube oil stocks. This recycling of spent lubricating oil not only makes economic sense in light of dwindling crude oil supplies, but is also ecologically sound.

Those skilled in the art of petroleum refining are well versed in fractionation and process control but, despite this fact, artisans always have sought methods to minimize capital costs of equipment and facilities, and to reduce the operating costs of petroleum refineries. The process of the present invention provides a facile and economical solution for the production of a lube oil fraction having a constant, predetermined flash point.

BRIEF SUMMARY OF THE INVENTION

The present invention relates to a process for fractionating a heavy hydrocarbon stream for the production of a lube oil fraction having a constant, predetermined flash point.

One embodiment of the present invention may be characterized as a process for fractionating a heavy hydrocarbon stream comprising a lube oil fraction and varying quantities of lower boiling hydrocarbon compounds to produce and recover the lube oil fraction having a constant, predetermined flash point wherein the process comprises: (a) introducing the heavy hydrocarbon stream into a vacuum fractionation zone; (b) withdrawing and cooling at least a portion of the lube oil fraction from the vacuum fractionation zone; (c) recycling at least a portion of the resulting cooled lube oil fraction produced in step (b) into the vacuum fractionation zone to control the top temperature of the vacuum fractionation zone; (d) controlling the cooling of the lube oil fraction in step (b) in response to a predetermined top temperature of the vacuum fractionation zone; and (e) recovering a lube oil fraction having a constant, predetermined flash point.

Other embodiments of the present invention encompass further details such as feedstocks and preferred operating conditions.

The process of the present invention provides the advantages of producing a lube oil fraction having a constant, predetermined flash point from a heavy hydrocarbon stream containing a lube oil fraction and varying quantities of lower boiling hydrocarbon compounds by controlling the cooling of a withdrawn lube oil fraction in response to the vacuum fractionator top temperature before the cooled lube oil fraction is reintroduced into the vacuum fractionator.

BRIEF DESCRIPTION OF THE DRAWING

The drawing is a simplified process flow diagram of a preferred embodiment of the present invention. The above-described drawing is intended to be schematically illustrative of the present invention and is not to be a limitation thereof.

DETAILED DESCRIPTION OF THE INVENTION

The present invention is a process for the production of a lube oil fraction having a constant, predetermined flash point. Suitable feedstocks for the process of the present invention are heavy hydrocarbon streams containing a lube oil fraction and varying quantities of lower boiling hydrocarbon compounds such as kerosene, for example. Such feedstocks, for example, are heavy hydrocarbon streams recovered during the re-refining of spent lubricant streams to recover, purify and upgrade lube blendstocks for subsequent reuse. The re-refining processes are usually relatively low capacity operations compared to a large scale petroleum refinery and the pretreatment and fractionation may not be as complete thereby producing heavy hydrocarbon streams containing lube oil fractions as well as varying amounts of lower boiling hydrocarbons. Since the feed to a re-refining process continuously varies in composition depending on the origin of the batch of the spent lubricant, the resulting heavy hydrocarbon stream will necessarily have components with varying boiling points.

It has unexpectedly been discovered that the process of the present invention is able to handle feedstock streams having continuously changing boiling point characteristics to produce lube oil fractions having a constant, predetermined flash point.

The process of the present invention utilizes a vacuum fractionation tower which is preferably operated at an overhead pressure in the range from about 10 to about 75 mm Hg pressure absolute and a top temperature in the range from about 200° F. to about 500° F. The feedstream is introduced into the vacuum fractionation tower wherein the lube oil fraction and lower boiling components are vaporized and travel upwards while the feed components having boiling points greater than the lube oil travel downward. In the upper end of the tower the lube oil fraction condenses and collects on a draw tray. A portion of the liquid lube oil fraction referred to as a pumparound stream is removed from the draw tray and split into two portions with one portion being cooled via indirect heat exchange and the second portion passes through a control valve which regulates the flow rate and bypasses the heat exchanger. The two portions are then recombined and introduced into the top of the vacuum fractionation tower which is above the draw tray. The temperature of the pumparound returned to the vacuum fractionation tower is determined by the amount of liquid flowing around or bypassing the heat exchanger. The reintroduced cooled lube oil fraction is preferably countercurrently contacted with an upwardly flowing vapor in a bed of packing which serves as a contact condenser. The temperature of the overhead vapor from the vacuum fractionation tower is monitored and is used to generate a signal which operates the above-described control valve. An appropriate temperature of the overhead vapor is determined to achieve the desired flash point of the lube oil and is subsequently controlled. In the event that the overhead vapor temperature increases above the desired temperature, a corresponding signal decreases the flow of liquid through the control valve and heat exchanger bypass which decreases the temperature of the liquid stream returning to the vacuum fractionation tower which in turn reduces the overhead vapor temperature to the desired temperature. In an analogous manner, if the overhead vapor temperature decreases below the desired temperature, a corresponding signal increases the flow of liquid through the bypass control valve which increases the temperature of the liquid stream to the vacuum fractionation tower which in turn increases the overhead vapor temperature to the desired temperature.

The feed to the process of the present invention may be any conveniently available heavy hydrocarbon stream containing hydrocarbons boiling in the lube oil range and varying quantities of lower boiling hydrocarbon compounds. Suitable sources of the feed are from the atmospheric fractionation of crude oil and from processes used to recover and recycle used lubricating oils. The process of the present invention is particularly useful for producing lube oil fractions having a constant, predetermined flash point from various batches of heavy hydrocarbons recovered from lube oil recycling. Recycled lube oils by their very nature have various boiling point characteristics depending on their source and are therefore particularly preferred feeds for the process of the present invention. Suitable feeds to process in the present invention may have boiling ranges from about 200° F. to about 1000° F. One of the advantages of the present invention is the adaptability to process feeds having a broad boiling range and constantly changing composition and boiling ranges.

The product lube oil fraction preferably has a flash point in the range from about 225° F. to about 375° F. The lube oil fraction which is removed from the vacuum fractionation zone is preferably steam stripped to remove residual lower boiling hydrocarbons.

DETAILED DESCRIPTION OF THE DRAWING

A feed stream containing a lube oil fraction and lower boiling hydrocarbon compounds is passed into the process via line 20 and introduced into vacuum fractionation zone 1. The lube oil fraction and the lower boiling hydrocarbons are vaporized and pass upwardly through an upper end of vacuum fractionation zone 1. At least a portion of the lube oil fraction begins to condense and collect on draw tray 2. The lower boiling hydrocarbons pass upwardly through draw tray 2, packing zone 3 and exit vacuum fractionation zone 1 via line 4. At least a portion of the resulting liquid lube oil fraction is withdrawn from draw tray 2 via lines 8 and 9, pumped with pump 11 and transported via lines 12 and 13 into heat-exchanger 16. The liquid lube oil fraction carried in line 12 is split to line 13 as described hereinabove and to line 14. The flow in line 14 is regulated by control valve 7 in response to a signal transmitted by line 6. The resulting cooled liquid lube oil fraction from heat-exchanger 16 is combined with the un-cooled liquid lube oil fraction transported through control valve 7 and line 15 in line 18 and introduced into vacuum fractionation zone 1 via conduit 18 and liquid distributor 19. The downwardly flowing liquid from liquid distributor 19 is contacted with upwardly flowing hydrocarbon vapor in packing zone 3 to cool the lower boiling hydrocarbons before exiting via line 4. A temperature controller 5 senses the temperature of the flowing stream in line 4 and sends a control signal via line 6 to control valve 7. At least another portion of the resulting liquid lube oil fraction is withdrawn from draw tray 2 via lines 8 and 10 to recover a lube oil fraction having a constant, predetermined flash point.

The process of the present invention is further demonstrated by the following illustrative embodiments. These illustrative embodiments are, however, not presented to unduly limit the process of this invention, but to further illustrate the advantages of the hereinabove-described embodiment. The following data were not obtained by the actual performance of the present invention, but are considered prospective and reasonably illustrative of the expected performance of the invention based upon sound engineering calculations.

ILLUSTRATIVE EMBODIMENT 1

A heavy hydrocarbon stream in an amount of 22,600 pounds per hour and having the characteristics presented in Table 1 is introduced into a vacuum fractionation tower. A hot liquid lube fraction having a temperature of 330° F. and in an amount of 45,450 lbs/hr is withdrawn from a top draw pan located in the upper end of the vacuum fractionation tower. A portion of the hot liquid lube fraction in an amount of 13,712 lbs/hr is introduced below the top draw pan. Another portion of the hot liquid lube fraction in an amount of 3723 lbs/hr is steam stripped to produce a product lube oil stream having a flash point of 250° F. and other characteristics presented in Table 2. Yet another portion of the hot liquid lube fraction in an amount of 28,015 lbs/hr is passed in parallel through a heat exchanger and a control valve and cooled to about 125° F. This resulting cooled stream is introduced into the top of the vacuum fractionation tower above the top draw pan. The temperature of the flowing liquid stream to the vacuum fractionation tower is controlled by a temperature controller which senses the temperature of the overhead vapor stream and sends a control signal to the control valve which regulates the flow around the heat-exchanger. An overhead stream having a temperature of 225° F. and in an amount of 1685 lbs/hr is removed via the overhead line from the vacuum fractionation tower.

ILLUSTRATIVE EMBODIMENT 2

A heavy hydrocarbon stream in an amount of 22,600 pounds per hour and having the characteristics presented in Table 1 is introduced into a vacuum fractionation tower. A hot liquid lube fraction having a temperature of 450° F. and in an amount of 45,152 lbs/hr is withdrawn from a top draw pan located in the upper end of the vacuum fractionation tower. A portion of the hot liquid lube fraction in an amount of 18,086 lbs/hr is introduced below the top draw pan. Another portion of the hot liquid lube fraction in an amount of 3266 lbs/hr is steam stripped to produce a product lube oil stream having a flash point of 350° F. and other characteristics presented in Table 2. Yet another portion of the hot liquid lube fraction in an amount of 23,801 lbs/hr is passed in parallel through a heat exchanger and a control valve and cooled to about 250° F. This resulting cooled stream is introduced into the top of the vacuum fractionation tower above the top draw pan. The temperature of the flowing liquid stream to the vacuum fractionation tower is controlled by a temperature controller which senses the temperature of the overhead vapor stream and sends a control signal to the control valve which regulates the flow around the heat-exchanger. An overhead stream having a temperature of 350° F. and in an amount of 3228 lbs/hr is removed via the overhead line from the vacuum fractionation tower.

TABLE 1

| Analysis of Feed to Vacuum Tower Distillation | |
|---|---|
| Volume Distilled Overhead, % | Boiling Point, °F. |
| 0 | 223 |
| 10 | 482 |
| 30 | 711 |
| 50 | 760 |
| 70 | 806 |
| 90 | 887 |
| 100 | 996 |

TABLE 2

Product Lube Oil Analysis

|  | Illustrative Embodiment 1 | Illustrative Embodiment 2 |
|---|---|---|
| Viscosity at 100° F. (Centistokes) | 6 | 13 |
| Flash Point, °F. | 250 | 350 |
| Distillation | | |
| Volume Distilled Overhead, % | Boiling Point, °F. | Boiling Point, °F. |
| 0 | 432 | 572 |
| 10 | 500 | 641 |
| 30 | 576 | 693 |
| 50 | 636 | 708 |
| 70 | 693 | 720 |
| 90 | 721 | 745 |
| 100 | 755 | 777 |

The foregoing description and illustrative embodiments clearly illustrate the advantages encompassed by the method of the present invention and the benefits to be afforded with the use thereof.

What is claimed:

1. A process for fractionating a heavy hydrocarbon stream comprising a lube oil fraction and varying quantities of lower boiling hydrocarbon compounds to produce and recover said lube oil fraction having a constant, predetermined flash point wherein said process comprises:

(a) introducing said heavy hydrocarbon stream into a vacuum fractionation zone;

(b) withdrawing and cooling at least a portion of said lube oil fraction from said vacuum fractionation zone;

(c) recycling at least a portion of the resulting cooled lube oil fraction produced in step (b) into said vacuum fractionation zone to control the top temperature of said vacuum fractionation zone;

(d) controlling the cooling of said lube oil fraction in step (b) in response to a predetermined top temperature of said vacuum fractionation zone; and (e) recovering a lube oil fraction having a constant, predetermined flash point.

2. The process of claim 1 wherein said lube oil fraction has a constant, predetermined flash point in the range from about 225° F. to about 375° F.

3. The process of claim 1 wherein said vacuum fractionation zone is operated at conditions including an overhead pressure from about 10 to about 75 mm Hg absolute and a top temperature from about 200° F. to about 500° F.

4. The process of claim 1 wherein said heavy hydrocarbon stream comprising a lube oil fraction and lower boiling hydrocarbon compounds has a boiling range from about 200° F. to about 1000° F.

* * * * *